United States Patent
Schultz et al.

(10) Patent No.: US 10,447,501 B2
(45) Date of Patent: Oct. 15, 2019

(54) SYSTEMS AND METHODS FOR ESTABLISHING A VLAN ON A COMPUTING SYSTEM IRRESPECTIVE OF THE COMPUTER NETWORKING TECHNOLOGY UTILIZED BY THE COMPUTING SYSTEM

(71) Applicants: Jason C Schultz, Roseville, MN (US); James Heit, Roseville, MN (US); John A Peters, Roseville, MN (US); Robert L Bergerson, Roseville, MN (US)

(72) Inventors: Jason C Schultz, Roseville, MN (US); James Heit, Roseville, MN (US); John A Peters, Roseville, MN (US); Robert L Bergerson, Roseville, MN (US)

(73) Assignee: Unisys Corporation, Blue Bell, PA (US)

( * ) Notice: Subject to any disclaimer, the term of this patent is extended or adjusted under 35 U.S.C. 154(b) by 173 days.

(21) Appl. No.: 14/950,708

(22) Filed: Nov. 24, 2015

(65) Prior Publication Data
US 2017/0149584 A1    May 25, 2017

(51) Int. Cl.
*H04L 12/46* (2006.01)
*H04L 12/24* (2006.01)

(52) U.S. Cl.
CPC ...... *H04L 12/4675* (2013.01); *H04L 41/0823* (2013.01)

(58) Field of Classification Search
None
See application file for complete search history.

(56) References Cited

U.S. PATENT DOCUMENTS

| | | | | |
|---|---|---|---|---|
| 2008/0123559 | A1* | 5/2008 | Haviv | G06F 8/61 370/255 |
| 2008/0155676 | A1* | 6/2008 | Johnson | H04L 45/00 726/13 |
| 2011/0202983 | A1* | 8/2011 | Pope | G06F 21/572 726/7 |
| 2012/0278599 | A1* | 11/2012 | Nilakantan | H04L 67/34 713/2 |
| 2017/0149584 | A1* | 5/2017 | Schultz | H04L 41/0823 |

* cited by examiner

*Primary Examiner* — Christopher T Wyllie
(74) *Attorney, Agent, or Firm* — Robert P. Marley

(57) ABSTRACT

Systems and methods for establishing a VLAN or a subinterface on a computing system using a single configuration statement are disclosed. Embodiments may include modifying a configuration statement that configures a NIC coupled to the computing system to include a new field which indicates if a VLAN should be created on the NIC port. Embodiments may also include receiving a configuration statement that includes the new field. Embodiments may further include creating a VLAN on an Ethernet computer network or a subinterface on an InfiniBand computer network based on the received configuration statement that includes the new field.

8 Claims, 4 Drawing Sheets

SYSTEMS AND METHODS FOR ESTABLISHING A VLAN ON A COMPUTING SYSTEM IRRESPECTIVE OF THE COMPUTER NETWORKING TECHNOLOGY UTILIZED BY THE COMPUTING SYSTEM

FIELD OF THE DISCLOSURE

The instant disclosure relates to computer networks. More specifically, this disclosure relates to the establishment of a virtual local area network (VLAN) on a computing system network irrespective of the networking technology utilized by the computing system.

BACKGROUND

The two most common networking technologies are Ethernet and InfiniBand, Each type of computer networking technology has features specific to its technology. For example, a VLAN is specific to an Ethernet network, while a subinterface is specific to an InfiniBand network. Because there are distinctions in the technology and terminology employed for each type of computer networking technology, configuration of each type of network includes different operations, such as the use of different configuration instructions and the manipulation of different types of hardware. Thus, when an administrator previously worked primarily with one type technology, the administrator must undergo significant training to master the other technology in order to fully utilize the technology. This training may lead to wasted resources as the administrator's time could be spent on more pressing tasks than training. Accordingly, conventional configuration of features on different networking technologies is less than optimal.

SUMMARY

The configuration of features on different networking technologies may be improved. by modifying a configuration statement to support the creation of either a VLAN on an Ethernet network or a subinterface on an InfiniBand network while only including terminology in the configuration statement related to Ethernet networking technology to avoid confusion, In particular, a method for establishing a virtual local area network (VLAN) or a subinterface on a computing system using a single configuration statement may include modifying, by a computing system, a configuration statement that configures a network interface controller (NIC) coupled to the computing system to include a new field which indicates if a VLAN should be created on the NIC port. The method may also include receiving, by the computing system, a configuration statement that includes the new field. The method may further include creating, by the computing system, a VLAN on an Ethernet computer network or a subinterface on an InfiniBand computer network based on the received configuration statement that includes the new field.

According to another embodiment, a computer program product may include a non-transitory computer-readable medium comprising instructions which, when executed by a processor of a computing system, cause the processor to perform the step of modifying a configuration statement that configures a NIC coupled to the computing system to include a new field which indicates if a VLAN should be created on the NIC port. The medium may also include instructions which, when executed by a processor of a computing system, cause the processor to perform the step of receiving a configuration statement that includes the new field. The medium may further include instructions which, when executed by a processor of a computing system, cause the processor to perform the step of creating a VLAN on an Ethernet computer network or a subinterface on an InfiniBand computer network based on the received configuration statement that includes the new field.

According to yet another embodiment, an apparatus may include a memory and a processor coupled to the memory. The processor may be configured to execute the step of modifying a configuration statement that configures a NIC coupled to the computing system to include a new field which indicates if a VLAN should be created on the NIC port. The processor may also be configured to execute the step of receiving a configuration statement that includes the new field. The processor may be further configured to execute the step of creating a VLAN on an Ethernet computer network or a subinterface on an InfiniBand computer network based on the received configuration statement that includes the new field.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the concepts and specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features that are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the disclosed systems and methods, reference is now made to the following descriptions taken in conjunction with the accompanying drawings.

DETAILED DESCRIPTION

A VLAN is a software-defined capability supported at layer 2 of a network that allows a LAN to be segmented. Grouping hosts with a common set of requirements regardless of their physical location by VLAN can greatly simplify network design. A VLAN may have the same attributes as a physical LAN, but may have the additional characteristic of allowing end hosts to be grouped together more easily even if they are not on the same network switch. In addition, VLAN membership can be configured through software instead of physically relocating devices or connections. Most enterprise-level networks today use the concept of virtual LANs. Without VLANs, a switch considers all interfaces on the switch to be in the same broadcast domain. The use of VLANs improves switch security by isolating traffic between VLANs. The terms VLAN and VLAN ID are features that are typically applied to Ethernet technology. The equivalent features on InfiniBand technology are sub-interface and Partition Key (PKey), respectively.

Figure 1:
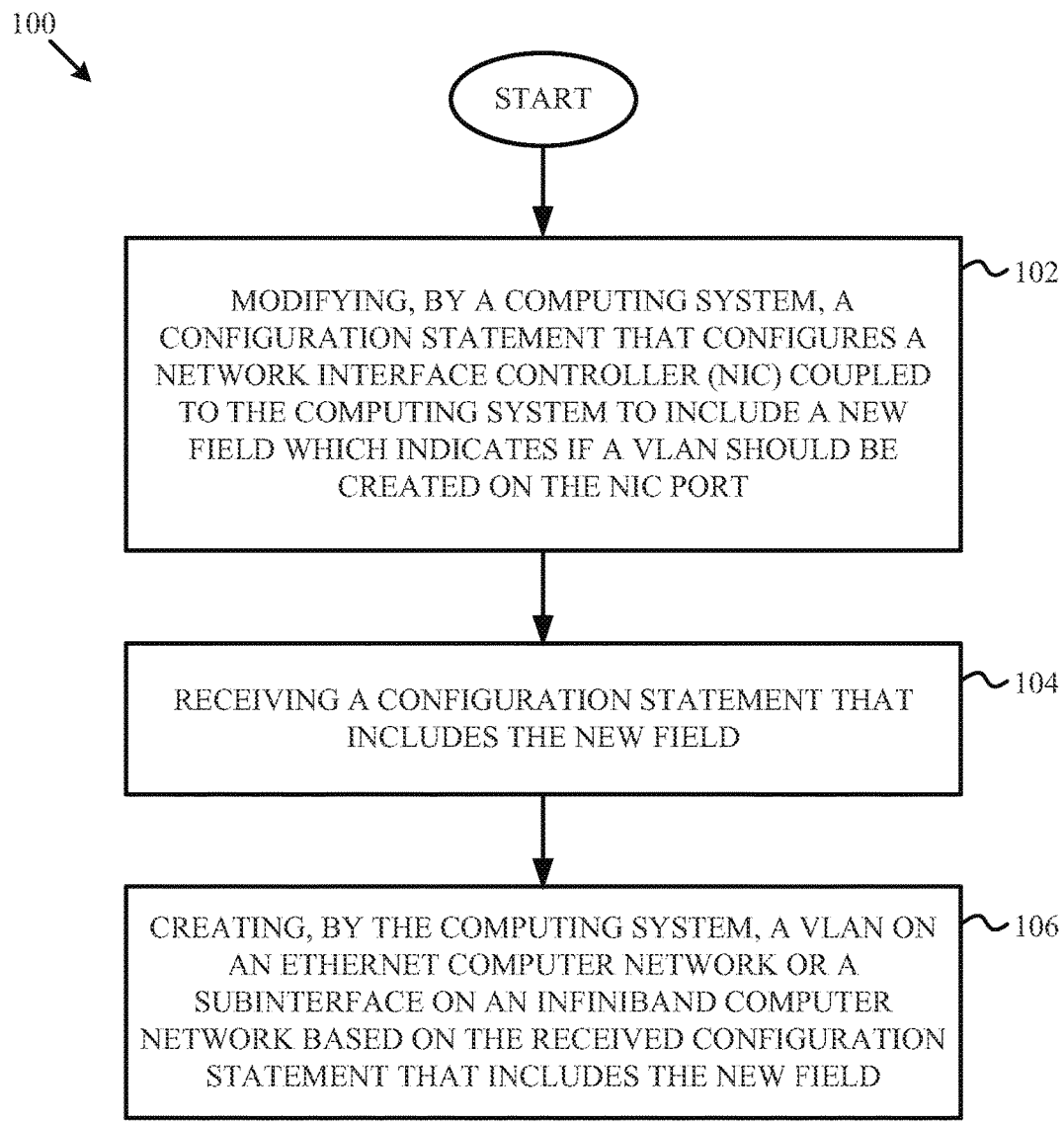
FIG. 1 provides a flow chart illustrating a method for establishing a VLAN or a subinterface on a computing system according to one embodiment of the disclosure.

FIG. 1 provides a flow chart illustrating a method for establishing a VLAN or a subinterface on a computing system using a single configuration statement according to one embodiment of the disclosure. It is noted that embodiments of method 100 may be implemented in accordance with the systems and embodiments described herein with respect to FIGS. 2-4, For example, embodiments of method 100 may be implemented by the computing systems illustrated in FIGS. 2-4, such as a management console 210 or node 240 of FIG. 2, server 302 of FIG. 3, or computer system 400 of FIG. 4. In general, embodiments of method 100 may be implemented by other similar systems without deviating from this disclosure so long as the systems, whether directly or indirectly, support the operations as described herein.

Specifically, method 100 includes, at block 102, modifying, by a computing system, a configuration statement that configures a NIC coupled to the computing system to include a new field which indicates if a VLAN should be created on the NIC port. In some embodiments, the computing system may be a computing system executing in a Unisys OS 2200 operating system or a computing system managed by a Unisys OS 2200 operating system. Such computing systems may include a System Architecture Interface Layer (SAIL), which is a firmware that provides the base OS for the hardware platform and the software environment in which the OS 2200 operating system and applications execute. Such computing systems may also include a Communications Platform for Open Systems (CPCommOS), which is a software product that is used to manage OS 2200 networking on SAIL-based systems. Network input/output support for the SAIL-based computing system may be provided by a shared object library, such as a Unisys XNIOP shared object library that emulates a host-resident input/output processor that supports network input/output in the SAIL-based computing system.

In some embodiments, CPCommOS may include a combination of hardware and/or software configured to connect network application programs with terminals, workstations, and other applications in a data communications network. For example, some of the functionality which CPCommOS may provide includes implementation of communication protocol stacks. In some embodiments, CPCommOS may include NICs to effectuate access to a communication network. CPCommOS may also be configured to support open communication standards.

As used herein, a NIC port may refer to a connection point on a NIC to which a data communications cable can be attached. A specific NIC port may be defined using a PCI slot, device, or function number, A NIC may have multiple ports.

According to one embodiment, the configuration statement that configures a NIC coupled to the computing system may be a configuration statement originally developed to manage an Ethernet network using terminology specific to Ethernet networking technology. For example, the configuration statement, prior to modification, may have been a configuration statement that did not include references to a subinterface because such terminology was specific to InfiniBand networking technology, not Ethernet networking technology.

As noted at block 102, modification of the configuration statement that configures a NIC coupled to the computing system may be effectuated by including a new field in the configuration statement which indicates if a VLAN should be created on the NIC port. After being modified, the configuration statement may define a NIC port in the network based on a. determination of whether the network is an Ethernet network or an InfiniBand network. Because a configuration statement may correspond to a specific NIC port, a multi-port NIC may need multiple configuration statements to define each of the multiple MC ports. In some embodiments, the configuration statements may define where the NIC port and interface are in the networked system. Each configuration statement may have a unique combination of SLOT, DEVICE, and FUNCTION values, unless it is part of a VLAN. In some embodiments, a VLAN allows more than one LAN to exist on a NIC port. According to some embodiments, the new field may include at least a numeric value. In some embodiments, the numeric value in the new field may be a ULAN ID number to use to access the VLAN on a NIC port. In some embodiments, the number must match a VLAN number that exists on a network switch coupled to the computing system.

At block 104, method 100 includes receiving, by the computing system, a configuration statement that includes the new field. At block 106, method 100 includes creating, by the computing system, a VLAN on an Ethernet computer network or a subinterface on an InfiniBand computer network based on the received configuration statement that includes the new field. For example, in some embodiments, upon processing of the received modified configuration statement that includes the new field, a VLAN or a subinterface may be created by segmenting at least one Ethernet or InfiniBand computer network switch to create at least one VLAN or subinterface and assigning a created VLAN or subinterface the numeric value in the new field. According to one embodiment, the created VLAN or subinterface may include a plurality of devices coupled to one or more network switches and at least one NIC port. Each of the plurality of devices in the created VLAN or subinterface may be associated with the numeric value in the new field. In some embodiments, only devices in the VLAN or subinterface, i.e., devices associated with or that possess the numeric value in the new field, may access data available in the VLAN or subinterface. Accordingly, devices that are not associated with or do not possess the numeric value in the new field may be restricted from accessing data available in the VLAN or subinterface.

In some embodiments, prior to creating the VLAN, the received configuration statement, such as the configuration statement received at block 104, may be processed to determine if a VLAN was specified in the configuration statement, i.e., if a VLAN should be created on the NIC port. In addition, the computing system may determine if the NIC port being configured with the configuration statement is part of an Ethernet computer network or part of an InfiniBand computer network. In other words, the computing system may determine whether the NIC coupled to the computing system is an Ethernet NIC or an InfiniBand NIC. Depending on whether the NIC being configured is part of an Ethernet computer network or an InfiniBand computer network, the VLAN may be created on an Ethernet computing network or the subinterface may be created on an InfiniBand computing network, such as at block 106. Accordingly, when the processing of the received configuration statement indicates that a VLAN should be created and the NIC port is determined to be part of an Ethernet computer network, the VLAN may be created on an Ethernet computer network based on the received configuration statement, such as at block 106. However, when the processing of the received configuration statement indicates that a VLAN should be created and the NIC port is determined to be part of an InfiniBand computer network, the subinterface may be created on an InfiniBand computer network, such as at block 106.

According to another embodiment, the received configuration statement may also be processed to determine if the new field was defined or left undefined. In addition, the computing system may also be configured to determine if a shared object, such as the XNIOP, that makes socket calls on behalf of the computing system is capable of processing the new field. For example, if the shared object is not compatible with the configuration statement or not configured to process the configuration statement with the new field, the shared object may be determined to not be capable of processing the new field. When the new field is determined to be defined and the shared object is determined to not be capable of processing the new field, the computing system may output a notice that VLAN information provided in the new field of the configuration statement will not be used to create a VLAN or a subinterface. In some embodiments, communication may still be effectuated by providing the shared object with information based on the original configuration statement, i.e., before the configuration statement was modified. For example, the shared object may be sent only information that would have been sent had the configuration statement not been modified to include the new field.

The schematic flow chart diagram of FIG. 1 is generally set forth as a logical flow chart diagram. As such, the depicted order and labeled steps are indicative of one embodiment of the disclosed method. While, for purposes of simplicity of explanation, methodologies are shown and described as a series of acts/blocks, it is to be understood and appreciated that the claimed subject matter is not limited by the number or order of blocks, as some blocks may occur in different orders and/or at substantially the same time with other blocks from what is depicted and described herein. Moreover, not all illustrated blocks may be required to implement methodologies described herein. It is to be appreciated that functionality associated with blocks may be implemented by various aspects of the systems disclosed herein. Other steps and methods may be conceived that are equivalent in function, logic, or effect to one or more steps, or portions thereof, of the illustrated methods. Additionally, the format and symbols employed are provided to explain the logical steps of the methods and are understood not to limit the scope of the methods. Although various arrow types and line types may be employed in the flow chart diagrams, they are understood not to limit the scope of the corresponding methods. Indeed, some arrows or other connectors may be used to indicate only the logical flow of the methods. For instance, an arrow may indicate a waiting or monitoring period of unspecified duration between enumerated steps of the depicted methods. Additionally, the order in which a particular method occurs may or may not strictly adhere to the order of the corresponding steps shown.

Figure 2:
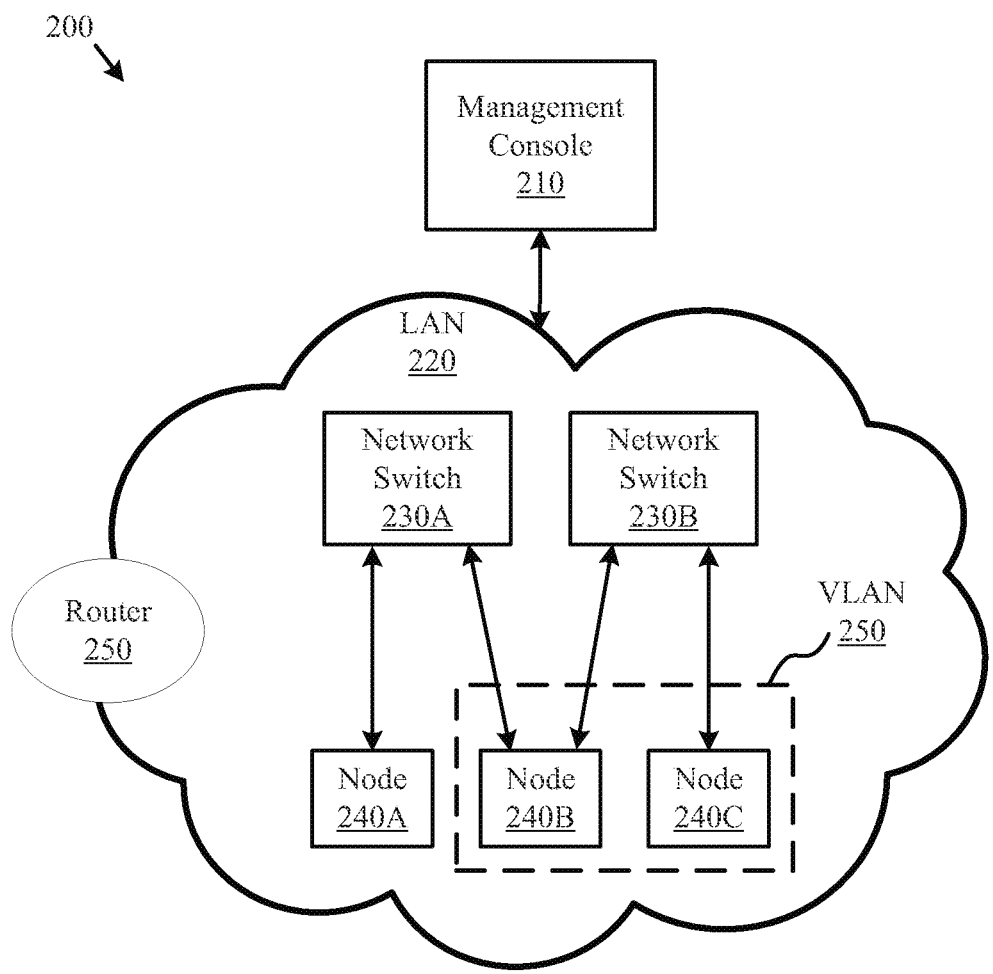
FIG. 2 is a block diagram illustrating a computer network system according to one embodiment of the present disclosure.

FIG. 2 is a block diagram illustrating a computer network system 200 according to one embodiment of the present disclosure. System 200 includes a local area network (LAN) 220 which manages communication between multiple devices connected to LAN 220 via either a wired technology, such as Ethernet or InfiniBand, or a wireless technology, such as Wi-Fi. For example, LAN 220 includes network switches 230A-230B which manage communication between nodes 240A-240C through LAN 220, System 200 also includes a router 250 which may be used to communicate data from the LAN 220 to other networks, such as a network connected to the Internet. System 200 further includes management console 210 to configure the operation of the LAN 220, network switches 230A-230B, and/or nodes 240A-240C, such as to create a virtual LAN (VLAN) 250.

Each of nodes 240A-240C may include one or more devices. For example a node 240 may include a general computing system, such as a computer, a storage device, and/or a server hosting other computing systems. In other embodiments, a node 240 may also include other devices, such as display devices. In some embodiments, the nodes 240 and communication between the nodes 240 may be managed by a software framework in addition to the physical framework that includes the network switches 230.

Communication between nodes 240 on LAN 220 may be managed by network switches 230. In some embodiments, each network switch 230 may be utilized to manage distinct nodes. For example, network switch 230A may be used to manage communication to and from node 240A while network switch 230B may be used to manage communication to and from node 240C. In other embodiments, network switches may be used to manage communication to and from devices in the same node. For example, network switches 230A and 230B may be used to manage communication to and from devices in node 240B.

The LAN 220 may facilitate communications of data between the nodes 240. As noted above, the LAN 220 may include a switched fabric computer network communications link including network switches 230A and 230B to facilitate communication between nodes 240. In general, the LAN 220 may include other types of communications network technology now known or later developed within the networking arts which permits two or more computers to communicate.

System 200 may further include a management console (shown here as management console 210) for providing management services for the overall system 200. Management console 210 may, for instance, communicate with nodes 240 to request operations to be performed at the nodes 240 and to request information from or provide information to the nodes 240. In addition, management console 210 may be configured to receive inputs from and provide outputs to a user of system 200, such as an administrator, thereby operating as a centralized management interface between the administrator and system 200. In the illustrative embodiment, management console 210 may be networked to nodes 240, although other embodiments of the present disclosure may implement management console 210 as a functional component of a node or any other processing system connected to or constituting system 210.

Management console 210 may also include processing capabilities and code which is configured to control system 200 in order to allow for management, configuration, and monitoring of the devices in system 200. For example, management console 210 may be a computing system, such as a computer and/or server, capable of executing instructions and configuring the devices in system 200 based on execution of the instructions. As an example, in one embodiment, the computing system 210 may configure the LAN 220 to include a virtual LAN 250 which includes nodes 240B and 240C. in some embodiments, the computing system 210 may create the VLAN 250, which may also be subinterface in an InfiniBand network, based on execution of configuration messages that have been modified from their original structure to include features and fields that instruct the computing system 210 to create a VLAN 250 on the LAN 220, which, as disclosed herein, may be a network utilizing InfiniBand computer network technology.

Figure 3:
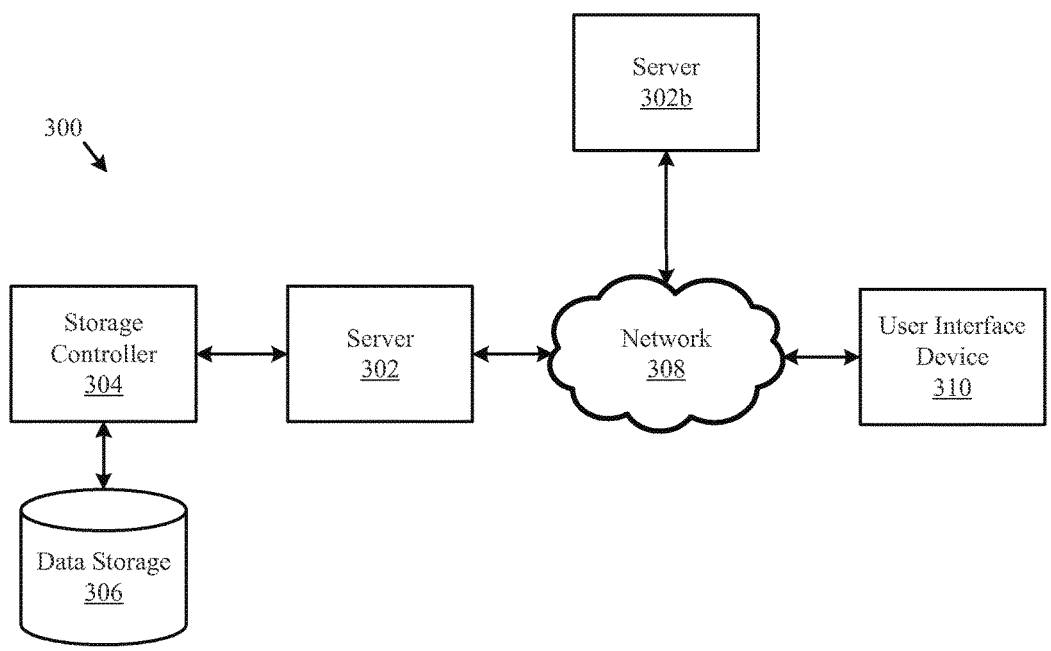
FIG. 3 is a block diagram illustrating a computer network according to one embodiment of the disclosure.

FIG. 3 illustrates one embodiment of a system 300 for establishing a VLAN or a subinterface on a computing system using a single configuration statement according to one embodiment of the disclosure. The system 300 may include a server 302, a data storage device 306, a network 308, and a user interface device 310, The server 302 may also be a hypervisor-based system executing one or more guest partitions hosting operating systems with modules having server configuration information. In a further embodiment, the system 300 may include a storage controller 304, or a storage server configured to manage data communications between the data storage device 306 and the server 302 or other components in communication with the network 308. In an alternative embodiment, the storage controller 304 may be coupled to the network 308.

in one embodiment, the user interface device 310 is referred to broadly and is intended to encompass a suitable processor-based device such as a desktop computer, a laptop computer, a personal digital assistant (PDA) or tablet computer, a smartphone or other mobile communication device having access to the network 308. In a further embodiment, the user interface device 310 may access the Internet or other wide area or local area network to access a web application or web service hosted by the server 302 and may provide a user interface for enabling a user to enter or receive information.

The network 308 may facilitate communications of data between the server 302 and the user interface device 310. In some embodiments, the network 302 may also facilitate communication of data between the server 302 and other servers/processors, such as server 302b. For example, the network 308 may include a switched fabric computer network communications link to facilitate communication between servers/processors, also referred to as data storage nodes. In some embodiments, the servers 302 and 302b may represent nodes or clusters of nodes managed by a software framework. The network 308 may include any type of communications network including, but not limited to, a direct PC-to-PC connection, a local area network (LAN), a wide area network (WAN), a modem-to-modem connection, the Internet, a combination of the above, or any other communications network now known or later developed within the networking arts which permits two or more computers to communicate.

Figure 4:
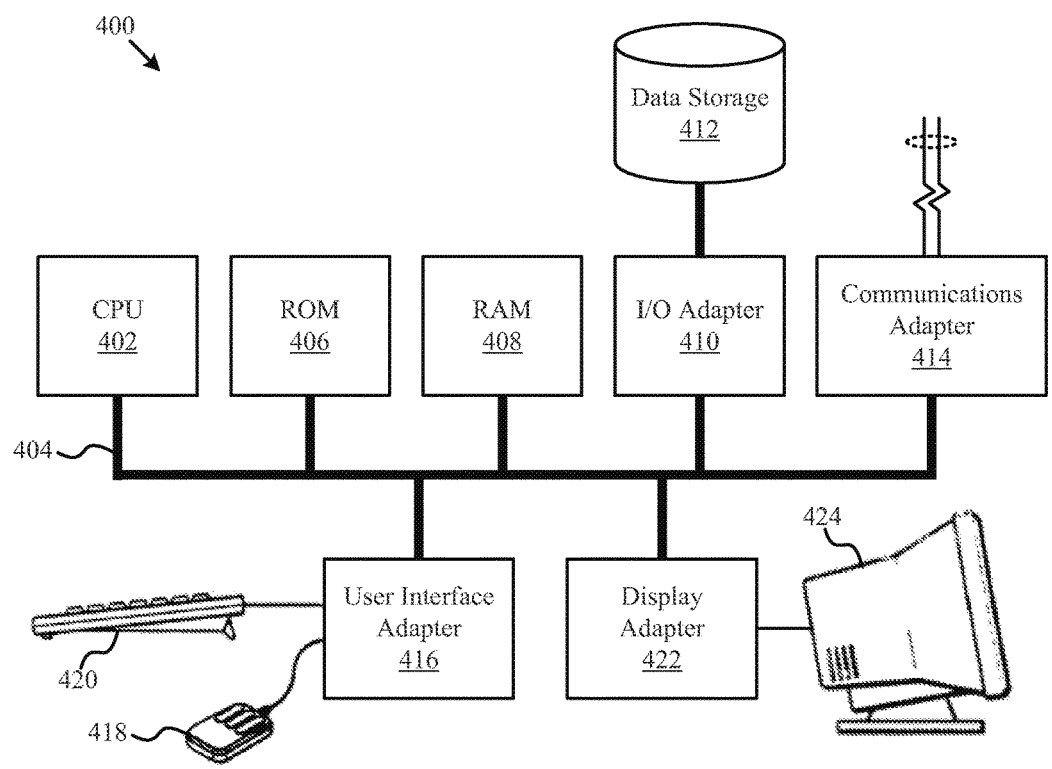
FIG. 4 is a block diagram illustrating a computer system according to one embodiment of the disclosure.

FIG. 4 illustrates a computer system 400 adapted according to certain embodiments of a server and/or a user interface device. The central processing unit ("CPU") 402 is coupled to the system bus 404. The CPU 402 may be a general purpose CPU or microprocessor, graphics processing unit ("GPU"), and/or microcontroller. The present embodiments are not restricted by the architecture of the CPU 402 so long as the CPU 402, whether directly or indirectly, supports the operations as described herein. The CPU 402 may execute the various logical instructions according to the present embodiments.

The computer system 400 may also include random access memory (RAM) 408, which may be synchronous RAM (SRAM), dynamic RAM (DRAM), synchronous dynamic RAM (SDRAM), or the like. The computer system 400 may utilize RAM 408 to store the various data structures used by a software application. The computer system 400 may also include read only memory (ROM) 406 which may be PROM, EPROM, EEPROM, optical storage, or the like. The ROM may store configuration information for booting the computer system 400. The RAM 408 and the ROM 406 hold user and system data, and both the RAM 408 and the ROM 406 may be randomly accessed.

The computer system 400 may also include an input/output (I/O) adapter 410, a communications adapter 414, a user interface adapter 416, and a display adapter 422. The I/O adapter 410 and/or the user interface adapter 416 may, in certain embodiments, enable a user to interact with the computer system 400. In a further embodiment, the display adapter 422 may display a graphical user interface (GUI) associated with a software or web-based application on a display device 424, such as a monitor or touch screen.

The I/O adapter 410 may couple one or more storage devices 412, such as one or more of a hard drive, a solid state storage device, a flash drive, a compact disc (CD) drive, a floppy disk drive, and a tape drive, to the computer system 400. According to one embodiment, the data storage 412 may be a separate server coupled to the computer system 400 through a network connection to the I/O adapter 410. The communications adapter 414 may be adapted to couple the computer system 400 to a network, which may be one or more of a LAN, WAN, and/or the Internet. The user interface adapter 416 couples user input devices, such as a keyboard 420, a pointing device 418, and/or a touch screen (not shown) to the computer system 400. The display adapter 422 may be driven by the CPU 402 to control the display on the display device 424. Any of the devices 402-422 may be physical and/or logical.

The applications of the present disclosure are not limited to the architecture of computer system 400. Rather the computer system 400 is provided as an example of one type of computing device that may be adapted to perform the functions of a server and/or the user interface device 410. For example, any suitable processor-based device may be utilized including, without limitation, personal data assistants (PDAs), tablet computers, smartphones, computer game consoles, and multi-processor servers. Moreover, the systems and methods of the present disclosure may be implemented on application specific integrated circuits (ASIC), very large scale integrated (VLSI) circuits, or other circuitry. In fact, persons of ordinary skill in the art may utilize any number of suitable structures capable of executing logical operations according to the described embodiments, For example, in some embodiments, aspects of the computer system 400 may be virtualized for access by multiple users and/or applications.

If implemented in firmware and/or software, the functions described above may be stored as one or more instructions or code on a computer-readable medium, Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer-readable medium, instructions and/or data may be provided as signals on transmission media included in a communication apparatus. For example, a communication apparatus may include a transceiver having signals indicative of instructions and data. The instructions and data may be configured to cause one or more processors to implement the functions outlined in the claims.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the present invention, disclosure, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for establishing a virtual local area network (VLAN) or a subinterface on a computing system using a single configuration statement, comprising:
    modifying, by a computing system, a configuration statement that configures a network interface controller (NIC) coupled to the computing system to include a new field which indicates if a VLAN should be created on the NIC port;
    processing the received configuration statement to determine if a VLAN should be created on the NIC port;
    determining if the NIC port is part of an Ethernet computer network or an InfiniBand computer network;
    creating, by the computing system, a VLAN on an Ethernet computer network based on the received configuration statement when the processing of the received configuration statement indicates that a VLAN should be created and the NIC port is determined to be part of an Ethernet computer network, or a subinterface on an InfiniBand computer network based on the received configuration statement that includes the new field when the processing of the received configuration statement indicates that a VLAN should be created and the NIC port is determined to be part of an InfiniBand computer network;
    processing the received configuration statement to determine if the new field was defined or left undefined;
    determining if a shared object that makes socket calls on behalf of the computing system is capable of processing the new field; and
    outputting a notice that VLAN information provided in the new field will not be used to create a VLAN or a subinterface when the new field is determined to be defined and the shared object is determined to not be capable of processing the new field.

2. The method of claim 1, further comprising:
    associating devices in the created VLAN or subinterface with a numeric value included in the new field; and
    restricting access to data available in the created VLAN or subinterface to devices that are not associated with or do not possess the numeric value.

3. The method of claim 1, wherein the created ULAN or subinterface comprises a plurality of devices coupled to one or more network switches and the NIC port.

4. The method of claim 1, wherein creating the VLAN or the subinterface comprises segmenting at least one computer network switch to create at least one VLAN or subinterface.

5. An apparatus, comprising:
    a memory; and
    a processor coupled to the memory, wherein the processor is configured to perform the steps of:
    modifying a configuration statement that configures a network interface controller (NIC) coupled to the computing system to include a new field which indicates if a VLAN should be created on the NIC port;
    processing the received configuration statement to determine if a VLAN should be created on the NIC port;
    creating a VLAN on an Ethernet computer network based on the received configuration statement when the processing of he received configuration statement indicates that a VLAN should be created and the NIC port is determined to be part of an Ethernet computer network, or a subinterface on an InfiniBand computer network based on the received configuration statement that includes the new field when the processing of he received configuration statement indicates that a VLAN should he created and the NIC port is determined to be part of an InfiniBand computer network;
    processing the received configuration statement to determine if the new field was defined or left undefined;
    determining if a shared object that makes socket calls on behalf of the computing system is capable of processing the new field; and
    outputting a notice that VLAN information provided in the new field will not be used to create a VLAN or a subinterface when the new field is determined to be defined and the shared object is determined to not be capable of processing the new field.

6. The apparatus of claim 5, wherein the processor is further configured to perform the steps of:
    associating devices in the created VLAN or subinterface with a numeric value included in the new field; and
    restricting access to data available in the created VLAN or subinterface to devices that are not associated with or do not possess the numeric value in the new field.

7. The apparatus of claim 5, wherein the created VLAN or subinterface comprises a plurality of devices coupled to one or more network switches and the NIC port.

8. The apparatus of claim 5, wherein creating the VLAN or the subinterface comprises segmenting at least one computer network switch to create at least one VLAN or subinterface.

* * * * *